Patented Aug. 4, 1925.

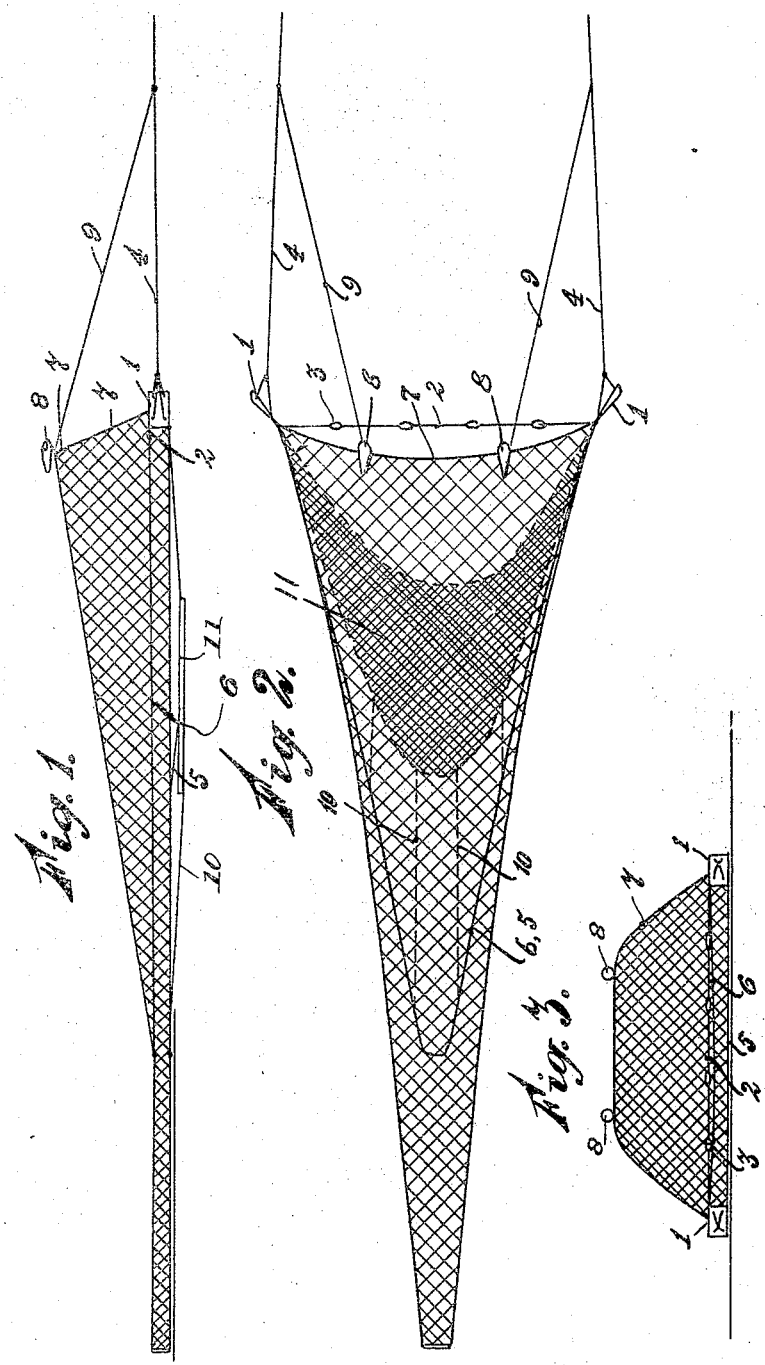

1,548,413

UNITED STATES PATENT OFFICE.

HENRI WILLEM DE VOOGT AND ROELOF DE BOER, OF HEEMSTEDE, NETHERLANDS.

TRAWLNET.

Application filed July 16, 1923. Serial No. 651,912.

*To all whom it may concern:*

Be it known that we, HENRI WILLEM DE VOOGT and ROELOF DE BOER, subjects of the Queen of the Netherlands, residing at Heemstede, the Netherlands, have invented certain new and useful Improvements in Trawlnets, of which the following is a specification.

The invention relates to trawl nets and in particular to a device for keeping open the mouth opening thereof.

In usual trawl nets namely the height of the opening is limited by the head line which is connected to the sheering board, and the height of this opening never becomes larger than the height of the boards. In consequence thereof large quantities of fish, frightened by the approaching net, escape backwardly over the upper cable or headline.

Numerous means have been used to endeavour to obtain a higher opening by lifting the headline of the net but with none of these means has the desired success been attained.

It has been proposed already to secure a dummy headline between the otterboards to determine their distance or amount of spread and to prevent strain upon the headline to which the net is attached.

In trying to lift this headline by means of floats or sheerboards as proposed, it will be found, however, that it cannot be raised to so great an extent as might be expected on account of the tension to which the net behind the headline is subjected.

The weight of the cod or back end of the net and its resistance when trawling, are transmitted to the boards by the whole surface of the net causing a large tension in all parts of the net.

The object of the invention is to provide a net-portion in the upper surface of the net and located behind the head line which is without or almost without tension.

To this end according to the invention one or more single or compound lines are connected to the otterboards, which lines carry the cod or back end of the net and form together with the dummy headline a triangle, the net-portion located between the sides of said triangle being without or almost without tension.

The lines carrying the back end may be joined to the seamlines of the trawl net.

In such a trawl net it has been found preferable to use two floating bodies connected to the headline which floating bodies are towed by branches of the towing lines of the otterboards.

The invention will be more fully understood with reference to the accompanying drawing illustrating a trawl net according to the invention by way of example.

Fig. 1 is a side elevation,
Fig. 2 a plan view of the net,
Fig. 3 a front-view of the trawlnet.

In all the figures the cables and lines are indicated by thick lines.

Between the otter boards 1 and at the upper rear side a connecting cable 2 is provided. This cable which is kept entirely free from the net has for its object to limit the width of the opening to a certain predetermined maximum distance; the boards cannot sheer out farther than is permitted by the length of this line. Preferably the line 2 is provided with one or more floats 3 to prevent this cable, when the net is launched, from becoming entangled in the net or between the boards.

The boards are further trailed by the lines 4 in the usual manner.

At the lower side the usual ground cable 5 is connected to the boards.

Besides the above-mentioned free cable 2 a second line 6 is attached to the upper rear side of the boards. This line may be a single or compound line and may also be joined to the seam lines in the net. It has for its object to transmit the weight and the resistance of the waist and the back net to the sheering boards. From a glance at Fig. 2 it will appear that the triangular net portion, located between the sheering board connecting line 2 and the cable 6, is almost without tension.

The front side of the net portion aforementioned relieved in this way from the tension is now connected to the upper cable 7, which is held very wide and which is carried at two places by the floats 8. To these floats trailing lines 9 are secured which are carried from the main lines 4 as branch lines.

This upper cable 7 which is now subjected to but little tension can be much lighter than the original upper cable.

Preferably the line 6 secured to the upper side of the otterboards is made as long as the ground rope 5 of the net, attached to the lower side of the boards. The net portion behind said ropes may be considered to be symmetric with respect to a horizontal plane at half the height of the otterboards. The upper surface of this back net portion in forward direction adjoins the portion held up by the headline or upper cable 7.

The horizontal plane at the lower side of the otterboards through the groundrope 5 shows a rather large open space. This space may be utilized for arranging a small flat net 11, serving as a knocker up. This flat net 11 is shown in Fig. 2 by a double hatching; in Fig. 1 it is for clearness sake shown as located below the groundrope 5, though theoretically it coincides in this projection with this rope itself. At the front side this net 11 is secured at each side in some way to an eye of the otterboard, at the rearside it may be connected to the groundrope 5 by means of some cables 10.

Having now particularly described and ascertained the nature of our said invention and in what manner the same is to be performed, we declare that what we claim is:

In a trawlnet, two otterboards, a dummy headline, a line connected to the boards, carrying the back end of the net and enclosing with the dummy headline a net portion being almost without tension, two floating bodies connected to the headline of the net and towing lines connected to the otterboards and having branches connected to the floating bodies.

In testimony whereof we affix our signatures.

HENRI WILLEM de VOOGT.
ROELOF de BOER.